United States Patent
Speedie

[11] 3,910,554
[45] Oct. 7, 1975

[54] VALVE

[76] Inventor: Robert Speedie, Flat 2, 10 Kokaribb Rd., Carnegie, Victoria, Australia, 3163

[22] Filed: June 5, 1974

[21] Appl. No.: 476,368

[30] Foreign Application Priority Data
June 13, 1973   Australia............................ 3649/73

[52] U.S. Cl. ............... 251/208; 251/175; 251/303; 251/314
[51] Int. Cl.² .......................................... F16K 5/10
[58] Field of Search ........... 251/175, 177, 208, 209, 251/298, 303, 314, 315

[56] References Cited
UNITED STATES PATENTS

| | | | |
|---|---|---|---|
| 658,975 | 10/1900 | Clancy............................... | 251/177 |
| 1,309,732 | 7/1919 | Hawley....................... | 251/182 X |
| 1,597,839 | 8/1926 | String............................. | 251/209 X |
| 2,784,740 | 3/1957 | Stageberg ...................... | 251/298 X |
| 3,214,133 | 10/1965 | Rodgers............................ | 251/175 |
| 3,269,415 | 8/1966 | Wapner.......................... | 251/175 X |
| 3,504,887 | 4/1970 | Okerblom.......................... | 251/208 |

*Primary Examiner*—Harold W. Weakley
*Attorney, Agent, or Firm*—Robert W. Beart; Jack R. Halvorsen

[57] ABSTRACT

The invention provides a valve for controlling the flow of fluid, such as water in an automobile heater system, having a valve housing with inlet and outlet openings, a resilient valve seat at the outlet opening and a valve member mounted for sliding movement transversely of the resilient valve seat such that pressure of fluid within the housing will press the valve member on to its seating when the valve is closed to increase the shut-off pressure of the valve.

Preferably that face of the valve member which is first to engage with the valve seat in the closing of the valve is shaped to provide a slow and gradual increase in the rate of flow of fluid through the housing when the valve is being opened.

3 Claims, 4 Drawing Figures

U.S. Patent   Oct. 7, 1975   3,910,554
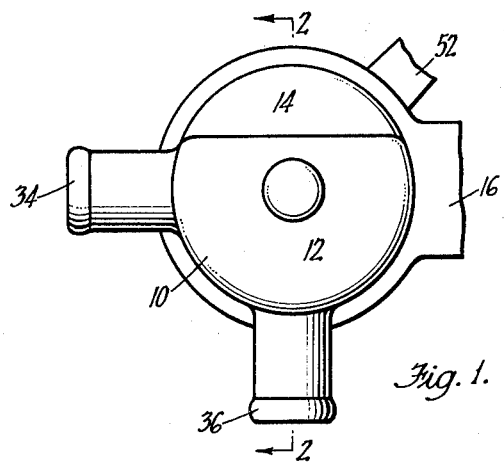
Fig. 1.
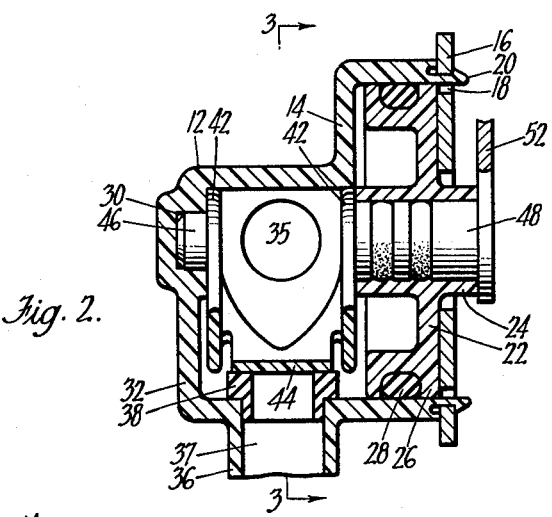
Fig. 2.
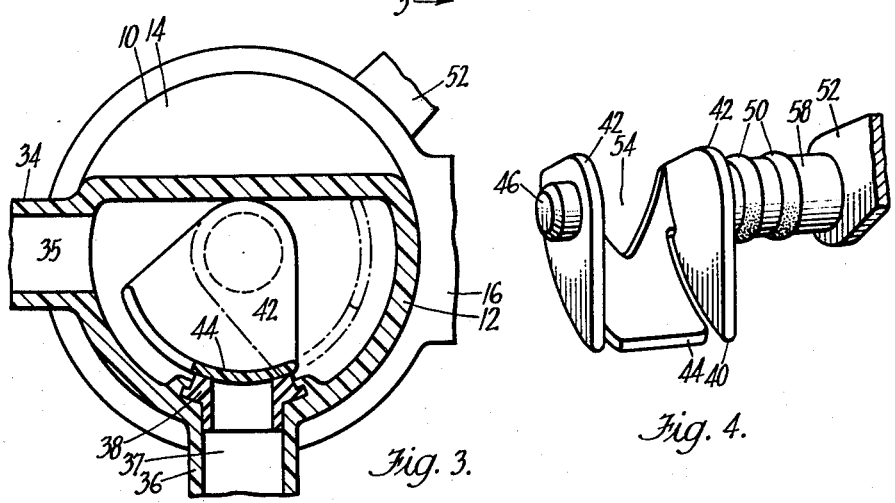
Fig. 3.
Fig. 4.

VALVE

This invention relates to an improved valve and it refers particularly but not exclusively to an improved valve for use in automobile heater systems for controlling the flow of heated liquid.

An object of the invention is to provide a valve for controlling the flow of liquid which will be of simple construction, convenient to operate and which will provide for a positive shut off of the liquid flow.

Another object is to provide a liquid-flow-control valve which will provide for a very slow and gradual increase in the rate of liquid flow when the valve is being opened, and a very slow and gradual decrease in the rate of liquid flow when the valve is being closed, which may be proportionate to the linear movement of the valve member.

A further object is to provide a liquid-flow-control valve of relatively simple design and construction which will be efficient in operation.

Accoridng to one aspect of this invention there is provided a flow control valve having a valve housing, an inlet to the housing, an outlet from the housing, a resilient sealing bush at the inner end of the outlet, and a valve member mounted in the housing for arcuate sliding movement into and out of sealing engagement with the bush.

Preferably the valve member is sufficiently flexible to seat on the sealing bush and effectively shut off the outlet opening under the pressure of fluid in the housing.

It is preferred that the valve member be shaped to provide for a metering of the fluid flowing through the valve housing - as by opening the outlet equal amounts for each unit of angular movement of the valve member.

In order that the invention may be clearly understood and readily put into practical effect there will now be described, with reference to the accompanying illustrative drawings, one exemplary construction of valve made according to the invention. In these drawings:

FIG. 1 shows a side elevation of the valve assembly;

FIG. 2 is a transverse cross-section on the line and in the direction of the arrows 2—2 of FIG. 1;

FIG. 3 is a longitudinal cross-section through the valve assembly, the section being on the plane and in the direction indicated by the line and arrows 3—3 of FIG. 2; and FIG. 4 illustrates the valve member in perspective.

FIG. 1 is on smaller scale than the other figures.

The valve assembly illustrated in these drawings has a valve housing 10 with one portion 12 of somewhat D-shape, and an adjacent portion 14 of substantially circular shape in longitudinal cross-section. These parts are shaped interiorly to house the operating parts of the valve. The housing 10, in use, is mounted on a bracket or plate 16 which extends across the open end of the portion 14, said plate 16 having a number of openings 18 which are engaged by detents 20 provided about the circular rim or edge of the housing portion 14.

Within the housing portion 14 is a bearing support member 22 having a journal bearing 24 and a rim portion 26 provided with a sealing ring 28, the centre line of the journal bearing 24 being coaxial with a bearing 30 in the closed end 32 of the housing portion 12 when the support member 22 is mounted in housing portion 14.

The housing portion 12 has an integral inlet member 34 with a passageway 35 and an integral outlet member 36 with a passageway 37 which, as illustrated, extend substantially radially from the valve housing 10 and substantially at right angles to each other. At the inner end of the outlet passageway 37 is a sealing bush 38 of resilient material, such as rubber or synthetic rubber. The interior of the housing part 12 is so made that the bush 38 may be snapped into position - see FIG. 3.

Mounted in the bearings 24, 30 is a flow control member 40 comprising two crank plates 42 having between them a valve member 44 and being mounted on a pintle 46 and an axle 48 provided with two sealing rings 50. An operating arm 52 is affixed to the outer end of the axle 48. The valve member 44 is adapted to engage with the inner surface of the sealing bush 38 so as to close the opening thereon, or to clear that bush so that the opening will be clear for the flow of liquid therethrough. For that purpose the inner surface of the bush is of arcuate shape. As the flow control member 40 is mounted for arcuate movement it is clear the valve member 44 must be curved to slide evenly over the inner face of the bush 38.

The front part of the valve member 44 is formed with a recess 54 of somewhat Vee shape, for the purpose of metering the opening and closing of the tap; additionally, the valve member 44 is supported by the two crank plates 42 only at the front end thereof so as to provide for a desired flexibility of the rear portion of the member relative to the crank plates, and said valve member is made such a thickness that it is flexible in itself under the normal operating pressures of the valve thereby enabling it to seal effectively on the inner surface of the resilient bush 38.

The flow control member is preferably made of a suitable plastics material, such as an acetal plastic, as are the housing 10 and the member 22.

The valve is operated by turning the arm 52 angularly, when the valve member 44 may be moved in an anti-clockwise direction, as shown in FIG. 3, from the "closed" position to the "open" position with the rear edge of the member 44 close to the upper side of the housing portion 12, as indicated by dotted lines in FIG. 3. In that opening movement the recess 54 will provide for a small initial flow of liquid through the outlet passageway 37, and a flow at a gradually increasing rate as the valve member 44 moves in the anti-clockwise direction. The recess 54 may be designed so that there is an even increase in the rate of liquid flow for each angular unit of movement of the valve member 44.

When the valve member 44 is in the closed position the pressure of liquid from the inlet passageway 35 will cause it to be pressed firmly on to the sealing bush 38, and due to the flexibility of the valve member and the resilience of the bush 38 a water-tight seal normally will be effected.

It is to be noted that the valve assembly is designed and constructed for ease of production, particularly for ease of assembly in that in the assembly of the parts the sealing bush 38 is first placed in position, the flow control member is then inserted into the housing so that its pintle 46 engages in the bearing 30, then the support member is slid over the journal 48 and into the housing part 14, the housing 10 is engaged with the plate 16, and the operating lever 52 is fastened to the end of the axle 48.

It will be apparent that modifications may be made in details of construction and design without departing from the ambit of the invention as defined by the appended claims.

I claim:

1. A valve comprising a housing having a valve chamber therein, a first outlet passageway having an inner end which leads into said valve chamber, an inlet passageway having an inner end which leads into said valve chamber, the inner ends of said outlet and inlet passageways extending substantially at a right angle with respect to each other, a crank comprising a first crank arm journalled in said housing and having an inner end which extends into said chamber, a first crank plate secured to the inner end of said first crank arm, a second crank plate spaced apart from said first crank plate, mounting means associated with said second crank plate for rotatably securing said second crank plate in said housing and a valve member formed of an arcuate plate which is secured to said first and second crank plates only at a first end thereof which is disposed toward said inlet passageway so that a second end of said valve member disposed away from said inlet passageway is flexible relative to said crank plates under normal operating pressures, a sealing member having an arcuate inner surface which matches the arcuate shape of said valve member secured in said outlet passageway so as to form a valve seal between said sealing member and said valve member, an operating arm secured to said first crank arm and mounted so as to move said valve member from a first position where it is in sealing engagement with said sealing member to a second position where fluid may flow through said inlet passageway to said outlet passageway.

2. A valve as claimed in claim 1 wherein said first end of said valve member is shaped to provide for substantially even metering of the fluid flowing through the outlet passageway of said valve member with respect to the position of said operating arm.

3. A valve as claimed in claim 2 wherein said first end of said valve member has a V-shaped recess which allows substantially equal increments of fluid to flow to said outlet passageway for each unit of angular movement of said valve member.

\* \* \* \* \*